Patented Apr. 13, 1937

2,077,322

UNITED STATES PATENT OFFICE 2,077,322

PROCESS FOR THE MANUFACTURE OF AZO DYESTUFFS FOR ESTERS OF CELLULOSE AND AZO DYESTUFFS OBTAINED THEREFROM

Daniel Hatt, Rouen, France, assignor to Compagnie Nationale de Matières Colorantes et Manufactures de Produits Chimiques du Nord Reunies, Etablissements Kuhlmann, Paris, France, a corporation of France No Drawing. Application February 21, 1936, Serial No. 65,108. In France March 5, 1935

6 Claims. (Cl. 260—97)

The present invention has for its object a process for the manufacture of valuable dyestuffs for the dyeing of esters of cellulose, consisting essentially in coupling the diazo derivatives of aromatic amines containing no free COOH and SO$_3$H groups, with hydroxyalkyl derivatives of 3-hydroxydiphenylamine, of the general formula:

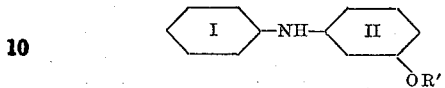

in which R′ represents a hydroxyalkyl group, whereby the phenyl nuclei I and/or II may in addition contain groups such as the alkyl or alkoxy groups and shall be further provided with at least one free position for coupling.

Among the hydroxyalkyl derivatives of 3-hydroxy-diphenylamine, those are particularly interesting which are obtained by the action of two molecules of ethylene oxide, propylene oxide, epichlorhydrin, or, in a general manner, an alkylene oxide, upon one molecule of a 3-hydroxy-diphenylamine.

The dyestuffs thus obtained are characterized by their excellent affinity for the esters of cellulose, their fastness to light and the good dischargeability of the shades obtained.

The coupling components employed according to the present invention have not hitherto been described in chemical literature. They can be obtained by treating 3-hydroxy-diphenylamine or its substitution products, or its derivatives acylated on the nitrogen, with ethylene oxide or epichlorhydrin or by any other suitable method; when the hydroxyalkylating agent is caused to react upon a derivative acylated on the nitrogen, there is obtained a product containing only one hydroxyalkyl group; when the hydroxyalkylating agent is caused to react upon a free 3-hydroxy-diarylamine it is possible on the contrary to obtain derivatives hydroxyalkylated on the nitrogen atom and on the oxygen atom.

The following examples illustrate the invention, without limiting the same thereto:—

Example 1

113.5 parts of N-acetyl-3-hydroxydiphenylamine, the melting point of which is 156° C. are heated in the presence of 150 parts of chlorobenzene in a steel autoclave with 24.2 parts of ethylene oxide to 135–140° C. for four hours. The ethylene oxide is quantitatively absorbed. The chlorobenzene is driven off and the residue is treated with 10% alcoholic caustic soda solution. The product of the reaction, which is quite insoluble in the caustic soda and the formula of which is probably:—

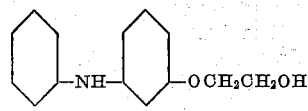

is a colorless crystalline powder which melts at 52° C.

Example 2

14 parts of para-nitraniline are diazotized in the customary manner. There is added to the diazo solution little by little, with good stirring, an emulsion prepared with 23 parts of 3-hydroxyethoxy-diphenylamine, 1.6 parts of size, 0.5 part of isopropyl naphthalene sulphonate of sodium and 60 parts of water, and brought to 10° C. The coupling is complete in a few hours. The product is filtered and washed with water. The dyestuff obtained has a good affinity for artificial silk from acetyl cellulose. It dyes the latter in scarlet red shades which are very full, brilliant and of good fastness properties.

Example 3

There is added to the diazo solution prepared in the customary manner from 18 parts of o-chloro-p-nitraniline an emulsion prepared with 23 parts of 3-hydroxyethoxy-diphenylamine. The dyestuff obtained dyes acetate artificial silk in brilliant ruby shades of good fastness properties.

Example 4

19 parts of 2,4-dinitraniline are dissolved in 185 parts of nitrosyl sulphuric acid containing 7 parts of NaNO$_2$. The solution is maintained for half an hour at 40° C. and then poured on to ice. There is then allowed to flow into the diazo solution thus obtained an emulsion prepared with 23 parts of hydroxyethoxy-diphenylamine. The coupling is very rapid. The dyestuff precipitates and it is filtered and washed with water. It dyes acetate artificial silk in brilliant carmine red shades of good fastness properties.

When the 2,4-dinitraniline is replaced by 6-bromo-2,4-dinitraniline, there is obtained a product which dyes acetate artificial silk in violet pink shades.

Example 5

The diazo solution obtained starting from 20 parts of aminoazobenzene is subjected to the addition of a concentrated solution of 23 parts of 3-hydroxyethoxy-diphenylamine in chlorobenzene. The whole is stirred briskly. The coupling is completed after a few hours. The chlorobenzene is driven off with steam. The residual dyestuff dyes acetate artificial silk in full and brilliant scarlet red shades.

Example 6

14 parts of 1,4-nitraniline are diazotized in the customary manner and the diazo solution obtained is added to a solution of 15.5 parts of 2,5-dimethoxyaniline in 37 parts of 10% hydrochloric acid and 600 parts of water. When the coupling is complete about 1800 parts of water are added. The dilute suspension of the monoazo compound thus obtained is heated to 50–60° C. There are then added 7.6 parts of sodium nitrite and the whole is stirred until the diazotization is complete. The diazo-azo compound passes into solution. This solution is filtered if necessary and cooled to 20° C. There is added thereto an emulsion containing 23 parts of 3-hydroxyethoxy-diphenylamine and prepared as in Example 2. The mixture is stirred while adding the amount of sodium acetate necessary to neutralize the mineral acidity. The dyestuff formed is filtered and washed. It dyes acetate cellulose in violet shades of good fastness to light.

Example 7

18.3 parts of 2,4-dinitraniline are dissolved in 185 parts of a nitrosyl-sulphuric acid containing 7 parts of NaNO$_2$. The solution is maintained for half an hour at 40° C. then poured on to ice. There is then allowed to flow into the diazo solution thus obtained an emulsion prepared with 24.5 parts of 4-methyl-3'-β-hydroxyethoxy-diphenylamine, 1.5 parts of size, 0.5 part of isopropyl naphthalene sulphonate of sodium and 85 parts of water, and brought to 0° C. The coupling is rapid. The dyestuff precipitates and it is filtered and washed with water. When dry, it constitutes 41 parts. It dyes acetate artificial silk in strong and brilliant Bordeaux shades of good fastness properties.

The 4-methyl-3'-β-hydroxyethoxy-diphenylamine, the formula of which is

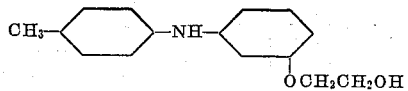

is obtained by the condensation of p-toluidine with resorcinol, the N-acetylation of the condensation product, the hydroxy ethylation of the N-acetyl derivative by means of ethylene oxide and the deacetylation of the product thus obtained.

When the 2,4-dinitraniline is replaced by 6-bromo-2,4-dinitraniline, there is obtained a product which dyes acetate artificial silk violet shades of good fastness properties.

Example 8

14.6 parts of bromo-4,5-dinitro-o-anisidine are introduced into 57 parts of sulphuric acid monohydrate and there is subsequently added the nitrosyl sulphuric acid prepared by dissolving 3.5 parts of NaNO$_2$ in 75 parts of monohydrate, then the whole is heated to 60° C. until the diazotization is complete. The solution is cooled to ordinary temperature and caused to flow into an emulsion prepared with 12.5 parts of 4-methyl-3'-β-hydroxyethoxy-diphenylamine, 0.3 part of isopropyl naphthalene sulphonate of sodium and 70 parts of water and brought to 0° C. The coupling is very rapid. The azodyestuff obtained dyes acetate artificial silk in brown shades of good fastness.

The bromo-4,5-dinitro-o-anisidine mentioned above is obtained by brominating the finely divided aqueous suspension of 4,5-dinitro-2-amino-1-anisol. It melts at 192–194° C.

Example 9

A diazo solution of 2,4-dinitraniline prepared as described in Example 7 is added to an emulsion prepared with 27.1 parts of 4-ethoxy-3'-β-hydroxyethoxy-diphenylamine, 1.5 parts of size, 0.5 part of isopropyl naphthalene sulphonate of sodium and 85 parts of water, and brought to 0° C. The coupling is rapid. The dyestuff obtained dyes acetate artificial silk in Bordeaux shades of good brilliancy.

The 4-ethoxy-3'-β-hydroxyethoxy-diphenylamine, the formula of which is:

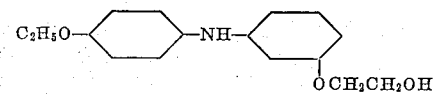

is prepared in a manner analogous to the 4-methyl derivative mentioned in Example 7 starting from p-phenetidine and resorcinol.

When in this coupling the 2,4-dinitraniline is replaced by 6-bromo-2,4-dinitraniline, there is obtained with the same coupling component a dyestuff dyeing acetate artificial silk violet.

When, on the other hand, the dinitraniline is replaced by bromo-4,5-dinitro-o-anisidine, there is obtained with the same coupling component a dyestuff dyeing acetate artificial silk in brown pink shades of good fastness.

Example 10

18.3 parts of 2,4-dinitraniline are diazotized as in Example 7. The diazo solution is added to an emulsion prepared with 27.5 parts of 3-methyl-6-methoxy-3'-β-hydroxy-ethoxy-diphenylamine, 2 parts of size, 0.8 part of isopropyl naphthalene sulphonate of sodium and 100 parts of water and brought to 0° C. The coupling is rapid. The dyestuff obtained dyes acetate artificial silk in brilliant deep Bordeaux shades of good fastness properties.

The 3-methyl-6-methoxy-3'-β-hydroxyethoxy-diphenylamine is obtained in a manner analogous to the 4-methyl-3'-β-hydroxyethoxy-diphenylamine in Example 7, starting from the condensation product of p-cresidine with resorcinol.

Example 11

74 parts of 3-hydroxydiphenylamine are heated in the presence of chlorobenzene in a steel autoclave with 39 parts of ethylene oxide to 150–155° C. during twelve hours. After 7–8 hours, the pressure in the autoclave remains fixed and the reaction is complete. The chlorobenzene is driven off with steam and the residual oil decanted. This latter can be distilled without decomposition; in a vacuum of 10 mm. it distills between 235 and 245° C.; it probably possesses the formula:

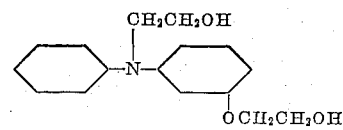

Starting from 4-methyl-3'-hydroxydiphenylamine, an analogous result is obtained, 100 parts of this product treated in the presence of chlorobenzene or of any other suitable solvent with 55 parts of ethylene oxide at 150° C. giving about 140 parts of a crystalline compound melting at 53° C. and distilling in a vacuum of 1–2 mm. between 230 and 238° C. without appreciable residue. Analysis shows the following formula:

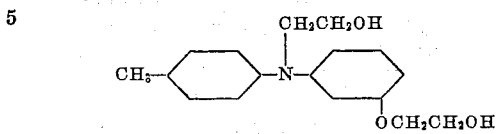

Example 12

14 parts of para-nitraniline are diazotized in the ordinary manner. There is added to the diazo solution, little by little with good stirring an emulsion prepared with 27.5 parts of N-β-hydroxyethyl-3-β-hydroxyethoxy-diphenylamine, 2 parts of size, 0.5 part of isopropyl naphthalene sulphonate of sodium and 60 parts of water and brought to 10° C. The coupling is complete in 1 hour. The product is filtered and washed with water.

There are obtained, after drying, 40 parts of a crystalline dyestuff which has for artificial silk from acetyl cellulose a good affinity. It dyes it in scarlet red shades which are very full, brilliant and of good fastness properties.

When the para-nitraniline is replaced by o-chloro-para-nitraniline there is obtained under the same conditions a dyestuff which dyes artificial silk from acetate cellulose in Bordeaux red shades of good fastness properties.

Example 13

19 parts of 2,4-dinitraniline are dissolved in 185 parts of a nitrosyl sulphuric acid containing 7 parts of NaNO₂. The solution is maintained for half an hour at 40° C. and then poured on ice. There is then caused to flow into the diazo solution thus obtained an emulsion prepared with 29 parts of 4-methyl-N-β-hydroxyethyl-3'-β-hydroxyethoxy-diphenylamine.

The coupling is very rapid. The dyestuff precipitates; it is filtered and washed with water. It dyes acetate artificial silk in brilliant Bordeaux shades of good fastness properties.

When the 2,4-dinitraniline is replaced by 6-bromo-2,4-dinitraniline there is obtained a product which dyes acetate artificial silk a violet pink which is full and brilliant.

Example 14

62 parts of 2,6-dichloro-4-nitraniline are diazotized in the customary manner by means of nitrosyl-sulphuric acid and the diazo solution obtained coupled with an emulsion obtained by means of 87 parts of 4-methyl-N-β-hydroxyethyl-3'-β-hydroxyethoxy-diphenylamine. The coupling is very rapid and provides a dyestuff which dyes acetate artificial silk a brown orange of good properties.

When the 2,6-dichloro-4-nitraniline is replaced by the bromo-4,5-dinitro-o-anisidine mentioned in Example 8, a dyestuff is obtained which dyes acetyl cellulose fibre in brilliant and full brown shades.

Example 15

121 parts of N-acetyl-3-hydroxy-4'-methyl-diphenylamine are treated at the boiling point with 94 parts of epichlorhydrin until the solubility in dilute caustic soda solution disappears. The excess of epichlorhydrin is then driven off. There remain about 160 parts of an oily product of a high content of halogen. On treatment with alkalies in methyl alcoholic solution it loses its halogen together with its acetyl group. The saponification product obtained can be distilled in a vacuum of 1 to 2 mm. between 233 and 235° C. without residue. About 120 parts of it are obtained. It is of oily consistency and its formula in all probability must be:

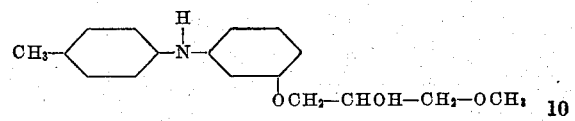

52.7 parts of this product are treated in the presence of chlorobenzene with 11 parts of ethylene oxide at 150° C. The condensation product obtained is an oil the formula of which must be:

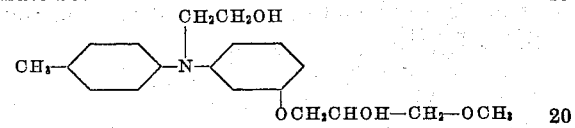

The coupling of this product dispersed in a suitable manner with a solution of 2-chloro-4-nitraniline provides a dyestuff dyeing acetate artificial silk in brilliant red shades.

When the 2-chloro-4-nitraniline is replaced by 6-bromo-2,4-dinitraniline there is obtained a dyestuff dyeing acetate artificial silk in violet shades.

Example 16

The dyestuff of Example 2 in a moist paste is mixed with 140 parts of a 50% solution of a dispersing agent such as sulphite cellulose waste liquor, then dried in vacuum and sieved.

5 parts of the dispersed product thus obtained are suspended in 10,000 parts of warm water containing in solution 50 parts of dextrin or any other suitable dispersing agent. There are then introduced 250 parts of acetate artificial silk. The temperature is brought to 80° C. in the space of half an hour and maintained at 80° C. for half an hour and then the dyed material is rinsed and dried. The acetate artificial silk is dyed a beautiful scarlet red shade.

I claim:

1. Process for the manufacture of azodyestuffs consisting in coupling diazotized amines containing no free—COOH and—SO₃H groups, with derivatives of the general formula

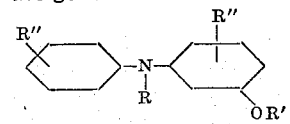

in which R is a member of the group consisting of hydrogen and hydroxyalkyl radicals, R' is a hydroxyalkyl radical and R" are members of the group consisting of hydrogen, alkyl and alkoxy radicals, while still having at least one free coupling position.

2. Process for the manufacture of azodyestuffs consisting in coupling diazotized amines containing no free—COOH and—SO₃H groups, with hydroxyalkyl derivatives of 3-hydroxydiphenylamine of the general formula:

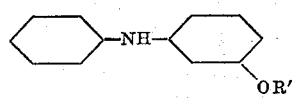

in which R' represents a hydroxyalkyl radical.

3. Process for the manufacture of azodyestuffs consisting in causing two molecules of alkylene oxide to react upon one molecule of a 3-hydroxydiphenylamine, then in coupling the hydroxyalkyl derivative of the 3-hydroxydiphenylamine thus obtained with diazotized amines containing no free—COOH and—SO₃H groups.

4. Azodyestuffs formed by coupling diazotized amines containing no free—COOH and—SO₃H groups, with derivatives of the general formula:

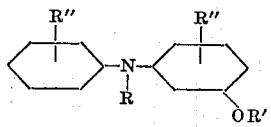

in which R is a member of the group consisting of hydrogen and hydroxyalkyl radicals, R' is a hydroxyalkyl radical and R'' are members of the group consisting of hydrogen, alkyl and alkoxy radicals, while still having at least one free coupling position.

5. Azodyestuffs formed by coupling diazotized amines containing no free—COOH and—SO₃H groups, with hydroxyalkyl derivatives of 3-hydroxydiphenylamine of the general formula:

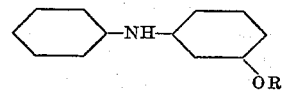

in which R' represents a hydroxyalkyl radical.

6. Azodyestuffs formed by causing two molecules of alkylene oxide to react upon one molecule of a 3-hydroxy-diphenylamine thus obtained with diazotized amines containing no free—COOH and—SO₃H groups.

DANIEL HATT.